United States Patent [19]

Jardin et al.

[11] Patent Number: 4,705,316
[45] Date of Patent: Nov. 10, 1987

[54] WIND DEFLECTOR ASSEMBLY FOR VEHICLES AND INSTALLATION UNIT EQUIPPED THEREWITH

[75] Inventors: Hans Jardin, Inning; Karl Dworschak, Munich, both of Fed. Rep. of Germany

[73] Assignee: Webasto-Werk W. Baier GmbH & Co., Stockdorf Gauting, Fed. Rep. of Germany

[21] Appl. No.: 689,601

[22] Filed: Jan. 8, 1985

[30] Foreign Application Priority Data

Jan. 18, 1984 [DE] Fed. Rep. of Germany ....... 3401550

[51] Int. Cl.⁴ .............................................. B60J 7/22
[52] U.S. Cl. ...................................... 296/217; 296/91
[58] Field of Search .................. 296/1 S, 91, 217, 216; 98/2.12, 2.13, 2.14; 248/221.3, 224.1, 224.2, 224.4

[56] References Cited

U.S. PATENT DOCUMENTS

| 3,402,907 | 9/1968 | Fisher | 248/221.3 |
| 3,727,973 | 4/1973 | Perks | 296/217 |
| 4,067,604 | 1/1978 | Mori | 296/217 |
| 4,081,194 | 3/1978 | Jardin | 296/1 S |
| 4,332,416 | 6/1982 | Lutz et al. | 296/216 |
| 4,342,481 | 8/1982 | Kanoi et al. | 296/217 |
| 4,362,332 | 12/1982 | Garnham | 296/217 |
| 4,380,351 | 4/1983 | Sorensen et al. | 296/1 S X |
| 4,393,754 | 7/1983 | Hough et al. | 296/217 X |

FOREIGN PATENT DOCUMENTS

| 1090407 | 10/1960 | Fed. Rep. of Germany | 248/224.2 |
| 3100731 | 12/1981 | Fed. Rep. of Germany | 296/217 |
| 489181 | 7/1938 | United Kingdom | 248/221.3 |
| 1253392 | 11/1971 | United Kingdom | 248/224.3 |

Primary Examiner—David A. Scherbel
Assistant Examiner—Russell D. Stormer
Attorney, Agent, or Firm—Sixbey, Friedman & Leedom

[57] ABSTRACT

Wind deflector assembly for vehicles with a sliding or sliding-lifting roof with a wind deflector blade which is connected, by way of at least one hinge, with a carrier part of a roof installation unit and which is swiveable around an axis of the hinge. The hinge has a bearing block attached releasably to the carrier part. The carrier part is provided with guides into which guide parts of the bearing block may be slid. At least one stop is provided for at least a temporary fixation of the bearing block, slid into the guides, with reference to the carrier part. An installation unit equipped with the deflector assembly may be pre-assembled and operationally tested prior to attachment of the unit to the vehicle roof, and can be installed in the vehicle without requiring steps necessitating re-assembly or re-alignment of the deflector assembly.

14 Claims, 4 Drawing Figures

WIND DEFLECTOR ASSEMBLY FOR VEHICLES AND INSTALLATION UNIT EQUIPPED THEREWITH

BACKGROUND AND SUMMARY OF THE INVENTION

The invention relates to a wind deflector for vehicles with a sliding or sliding-lifting roof having a wind deflector blade that is connected by way of at least one hinge with a carrier part of a roof installation unit and which may be swivelled around an axis of the hinge, whereby the hinge has a bearing block attached releasably on the carrier part.

In the case of a known wind deflector of this type (U.S. Pat. No. 4,332,416), the bearing block is connected with the carrier part by way of attaching screws which, at the same time, serve for the attachment of the roof installation unit in the vehicle. As a result of the insertion of the sliding roof installation unit, mounting and aligning operations during the insertion into the vehicle are kept small because the installation unit is preassembled and tested for proper functioning prior to installation. It is desirable to also include the wind guard in this functional testing preceding the insertion into the vehicle. Therefore, in the case of the known arrangement, the bearing block is screwed together with the carrier part. This screwing together, however, must be undone in order to enable insertion of the installation unit into the vehicle. This is cumbersome. Moreover, the preliminary alignment of the wind deflector will be lost as a result.

The invention, therefore, is based on the task of creating a wind deflector of the initially mentioned type which, together with the sliding roof installation unit, may be preassembled particularly easily and precisely, thereby permitting a simplified insertion into the vehicle without disturbing the prealignment of the parts during the insertion into the vehicle.

This task is solved in accordance with a preferred embodiment of the invention by providing the carrier part with guides into which guide parts of the bearing block may be pushed and by providing at least one stop for at least temporary fixing of the bearing block relative to the carrier part when it is slipped into the guides.

As a result of the cooperation of the guides and guide parts of the carrier part and the bearing block, a mutual alignment of bearing block and carrier part will be achieved, during the premounting, in a simple and precise manner. As a result of the stop, the bearing block and the carrier part are held in this relative position not only during the premounting of the installation unit and its functional testing, but also during the transportation of the unit and during insertion of the unit into the vehicle. Consequently, in the case of the insertion, it will not be necessary to initially take off attaching screws or other attaching elements. As a rule, no subsequent alignment will be needed either.

The bearing block with its guide parts may effectively be slipped, from the front, into the guides of the carrier part. In order to guarantee a precise spatial, mutual alignment of bearing block and carrier part, that is to say an alignment in all three directions of movement, the guide parts of the bearing block, in accordance with a further aspect of the invention, have lateral guide surfaces running in the direction of sliding in, have at least one stop limiting the sliding in movement and running transversely to the sliding in direction, have at least one bottom surface seated on the carrier part and at least one upper guide surface placing itself, in the slid-in state, below a countersurface of the carrier part.

In the interest of a particularly safe support, upper guide surfaces cooperating with countersurfaces of the carrier part are developed, advantageously, at both sides of the bearing block. The premounting is further facilitated whenever the bearing block is provided with slanting surfaces for the automatic centering thereof with reference to the guides of the carrier part, during the sliding in. The stop may be formed simply by a resiliently deflectable tongue on the carrier part and a stop opening of the bearing block cooperating therewith when the bearing block is slipped in.

Furthermore, the bearing block and the carrier part are preferably always provided with at least one opening or passage which, in the case of a slid in bearing block, are aligned with one another and are intended for the reception of an attaching element, for example, of an attaching screw, during the mounting of the functional unit in the vehicle.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE PREFERRED EMBODIMENT

Figure 1:
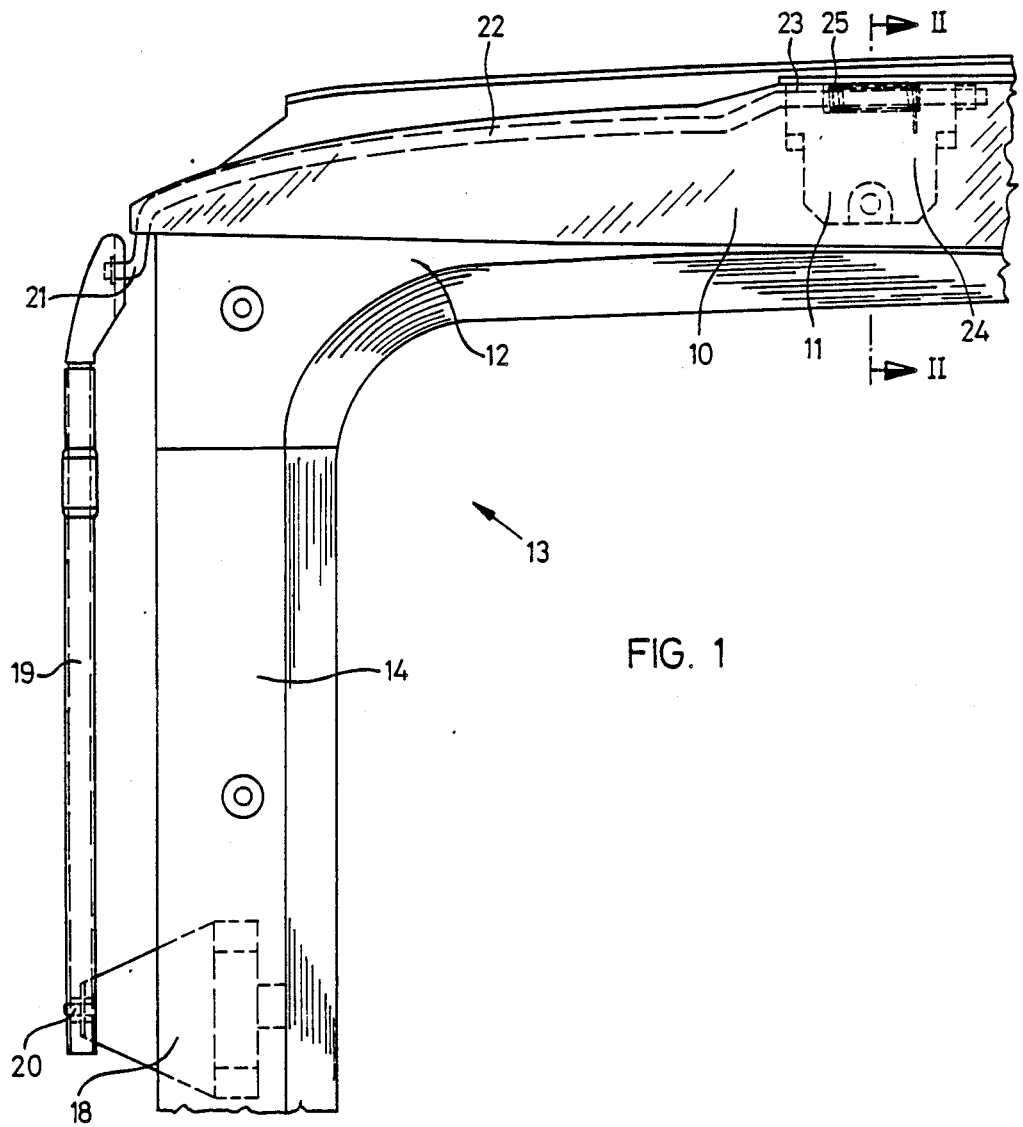
FIG. 1 shows a top view of the left part of the wind deflector with the adjacent functional parts of the roof installation unit serving for the adjusting movement of the wind deflector blade.
Figure 3:
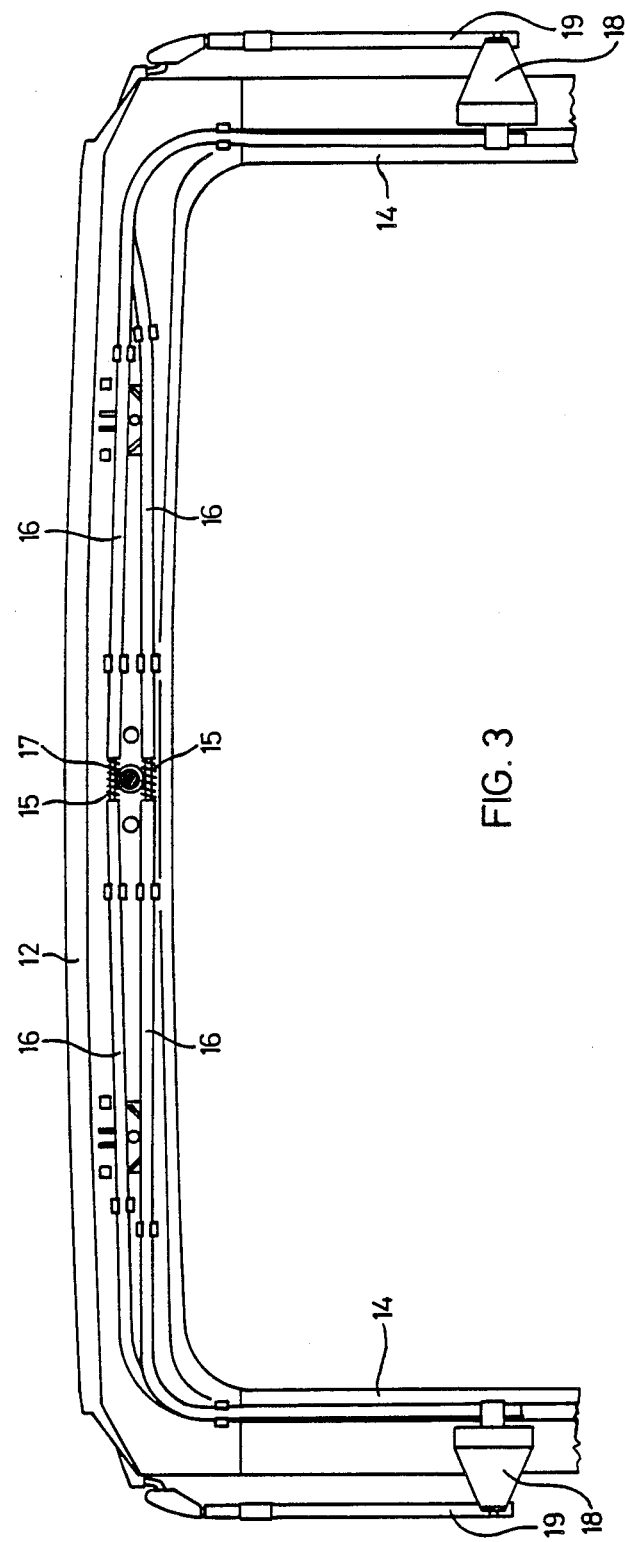
FIG. 3 is a view of the wind deflector and of the adjacent parts of the sliding roof-functional unit from below.

A wind deflector blade 10 is connected, in the case of the illustrated embodiment, by way of two hinge assemblies designated generally by the numeral 11, of which only the left one has been shown in FIG. 1 along with the carrier part 12, which is in the form of a plastic cover and is part of a roof installation unit 13. The installation unit 13 may be constructed in the manner explained in the noted U.S. Pat. No. 4,332,416. Therefore, to the extent necessary to complete an understanding of the present application, reference may be made to said patent and the detailed description of the installation unit will be restricted herein, to only those parts located in the area of or directly involved in the inventive aspects of this application. Besides the carrier part 12, among others, parts of the installation unit include guide rails 14 and sliding roof driving members, for example, in the form of pressure resistant threaded cables 15 (FIG. 3) which are guided, in the area of the forward edge of the roof opening, in pipes 16 which are snapped on to the underside of the carrier part 12 and which cooperate with a driving pinion 17. Supports 18 are firmly connected with the lateral guide rails 14 and have swivel bearings (not shown in detail) for levers 19. The levers 19 serve for exposing the deflector and pivot around an axle 20 at one end. The other end of the levers 19 (i.e., that which is disposed away from the axle 20) receives a bent end 21 of an axle 22, which is firmly connected with the wind deflector blade 10, for example, is welded together with it.

The end of the axle 22 lying away from the bent end 21 is rotatably mounted in two bearings 23 of a bearing block 24. Between the bearings 23, a legged coil spring 25 is seated on the axle 22. One leg 26 of spring 25 is supported in a recess 27 of the bearing block 24 and the other leg 28 fits, under pretension, against the underside of the wind deflector blade 10. The spring acts to move the wind deflector blade 10 into the pushed out position indicated in FIG. 2 by a broken line. Whenever the sliding cover 29 is moved into it closed position, a functional part (not shown), that is shiftable together with the cover 29, engages against the lever 19 and causes it to swing downwards around the axle 20 and so as to force the bent end 21 of the axle 22 to rotate counter to the force of the spring 25. As a result, the wind deflector blade 10 is shifted into the position illustrated in solid lines in FIG. 2.

Figure 4:
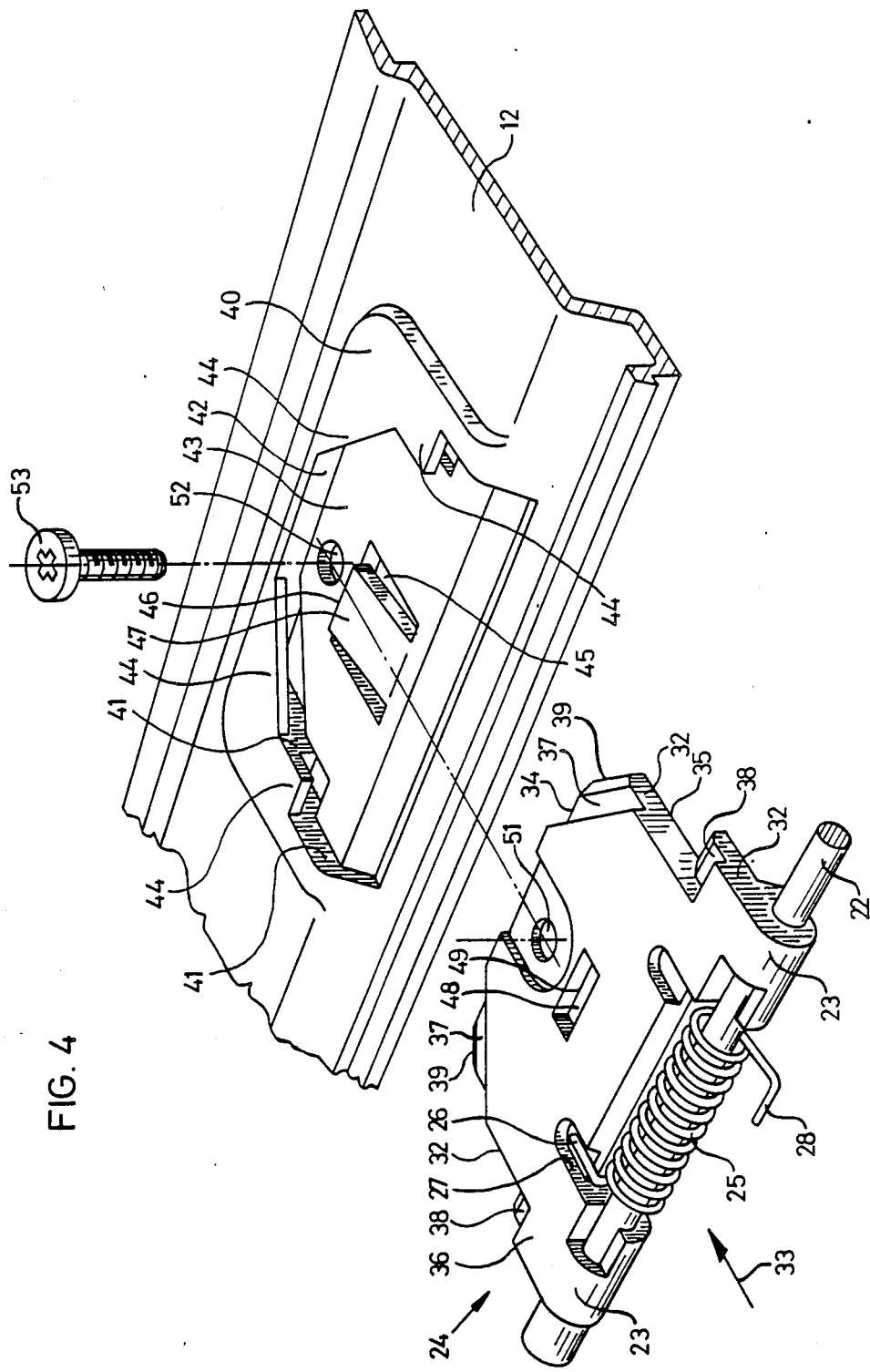
FIG. 4 shows, on a larger scale, an exploded perspective view of a bearing block and of a receiving element of the carrier part that cooperates therewith.

The bearing block 24 has two, stepped lateral guide surfaces 32 (FIG. 4) which extend in a sliding-in direction indicated by the arrow 33. The end of the bearing block 24 located away from the bearings 23 forms a stop edge 34 extending transversely to the sliding-in direction. The bottom surface of the bearing is designated by 35. Upper guide surfaces 37, 38 are stepped downwards relative to the upper side 36 of the bearing block 24 and are located on both sides of the bearing block 24, adjacent to the lateral guide surfaces 32. Slanting surfaces 39 are formed at both sides, angling between the stop edge 34 and a respective lateral guide surface 32.

The carrier part 12 has a bearing block receiving element 40 with guides complementary to the guide parts of the bearing block 24, which guides are formed of lateral guides 41 for cooperating with the lateral guide surfaces 32, a stop surface 42 against which the stop edge 34 fits, a supporting surface 43, and countersurfaces 44 for cooperating with the upper guide surfaces 37, 38. In the middle area of the supporting surface 43, there is a U-shaped cut 45 which forms a tongue 47 that is shaped so as to project, in its relaxed state, with its free end 46 resiliently displaceable located above the supporting surface 43. An aperture 48 is developed in the bearing block 24.

Whenever the bearing block 24 is pushed into the receiving element 40, then first of all, the slanting surfaces 39 take care of an automatic centering of the bearing block 24 with reference to the receiving element 40. The bottom surface 35 of the bearing block forces the tongue 47 downwards. The dimensios are selected such that, whenever the stop edge 34 reaches the stop surface 42, the edge 49 of the aperture 48 that is furthest from the axle 22 has passed beyond the end 46 of the tongue 47. The tongue 47 therefore bounces back and it fits with its end 46 against the edge 49. The bearing block 24 in this way will be held securely in the slid-in position by the spring latch means formed by tongue 47 and aperture 48. At the same time, the upper guide surfaces 37, 38 are resiliently forced upwards by the tongue 47 against the countersurfaces 44. In this premounted state, the wind guard together with the remaining components of the roof installation unit 13 may be operational tested and may be aligned, in a manner not illustrated in detail, for example, with regard to the level of exposure and/or force of exposure, without there being a need for additional attaching means between the carrier part 12 and the bearing blocks 24.

Figure 2:
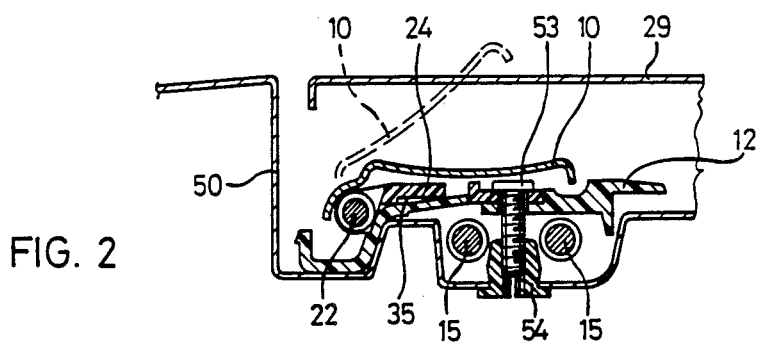
FIG. 2 shows a cross section along the line II—II of FIG. 1.

In the case of insertion of the roof installation unit 13 into the vehicle, the carrier part 12 will be set up in the manner apparent from FIG. 2 on a roof frame 50 surrounding the roof opening and connected with the solid roof skin. A screw 53 is put through openings of passage 51, 52, which are aligned with one another in the bearing block 24 and in the carrier part 12, and is screwed into a cap nut 54 that reaches through a recess in the roof frame 50.

In the event that repairs are required later, the wind deflector may easily be slipped off and taken out by removing the screws 53 from the two bearing blocks 24 and by pushing the resilient tongue 47 down, such as by insert of the end of a screw driver into aperture 48.

While we have shown and described a single embodiment in accordance with the present invention, it is understood that the same is not limited thereto, but is susceptible of numerous changes and modifications as known to those skilled in the art, and we, therefore, do not wish to be limited to cover all such changes and modifications as are encompassed by the scope of the appended claims.

We claim:

1. In an installation unit of the type for attachment to a frame mounted within a vehicle roof aperture, to which a roof panel for opening and closing said aperture is mountable and having longitudinal guides, a cross-piece interconnecting said guides at a forward end thereof, support means for supporting said roof panel in a displaceable manner, and cable drive means connected between said cross-piece and said support means for producing displacement of the roof panel, all of which are associated with each other in an operational manner enabling complete testing of said cable drive means to establish the proper operability thereof without attachment of said installation unit to said frame, the improvement for enabling hinged attachment of a deflector assembly to a carrier part of the installation unit by way of a releasably attachable carrier part and a bearing block, as well as alignment and operational testing for establishing the proper operation thereof, in a manner enabling the installation unit to be attached to the vehicle roof frame without necessitating re-assembly or re-alignment of the deflector assembly, wherein the carrier part is provided with guides, said guides being sized and configured relative to complementary guide parts of the bearing block for slidably receiving the bearing block, wherein at least one spring latch means is provided for a temporary fixing of the bearing block relative to the carrier part upon insertion thereof into the guides, and wherein attachment means is provided for installation securement of said bearing block to both said carrier part and said frame.

2. Wind deflector assembly according to claim 1, wherein the bearing block is provided with slanting surfaces for providing an initial automatic centering thereof relative to the guides of the carrier part as the bearing block is slid into the guides.

3. Wind deflector assembly according to claim 1, wherein the spring latch means is formed by a resiliently shiftable tongue on the carrier part and a latch opening in the bearing block that cooperates with the tongue.

4. Wind deflector assembly according to claim 1, wherein the bearing block and the carrier part are provided with at least one opening which are aligned with one another for the reception of an attaching element therethrough for the mounting of the installation unit in the vehicle when the bearing block is received by the guides of the carrier part.

5. Wind deflector assembly according to claim 1, wherein said guides are oriented for causing the sliding-in movement of the bearing block to be in a substantially horizontal direction from an edge of the carrier part rearwardly along a surface thereof.

6. Wind deflector assembly according to claim 5, wherein the bearing block is provided with slanting surfaces for providing an initial automatic centering thereof relative to the guides of the carrier part as the bearing block is slid into the guides.

7. Wind deflector assembly according to claim 5, wherein the spring latch means is formed by a resiliently shiftable tongue on the carrier part and a latch opening in the bearing block that cooperates with the tongue.

8. In an installation unit according to claim 1, wherein the parts of the bearing block comprise lateral guide surfaces running parallel to a direction of slide-in reception of the bearing block within the guides of the carrier part, at least one stop limiting the extent of sliding in movement and running transversely to the sliding in direction, at least a bottom surface for seating on the carrier part, and at least one upper guide surface that is received in the slid-in state, below a countersurface forming one of the guides of the carrier part.

9. Wind deflector assembly as in claim 8, wherein a said upper guide surface is provided at both sides of the bearing block.

10. Wind deflector assembly according to claim 8, wherein the bearing block is provided with slanting surfaces for providing an initial automatic centering thereof relative to the guides of the carrier part as the bearing block is slid into the guides.

11. Wind deflector assembly according to claim 8, wherein said guides are oriented for causing the sliding-in movement of the bearing block to be in a substantially horizontal direction from an edge of the carrier part rearwardly along a surface thereof.

12. Wind deflector assembly according to claim 8, wherein the bearing block and the carrier part are provided with at least one opening which are aligned with one another for the reception of an attaching element therethrough for the mounting of the installation unit in the vehicle when the bearing block is received by the guides of the carrier part.

13. In an installation unit according to claim 8, wherein the stop is formed by a resiliently shiftable tongue on the carrier part and a stop opening in the bearing block that cooperates with the stop.

14. In an installation unit according to claim 8, wherein the bearing block and the carrier part are provided with at least one opening which are aligned with one another for the reception of an attaching element therethrough for the mounting of the installation unit in the vehicle when the bearing block is received by the guides of the carrier part.

* * * * *